United States Patent [19]
Gogolin et al.

[11] 4,129,770
[45] Dec. 12, 1978

[54] PLUNGE DAMPENER

[75] Inventors: Robert L. Gogolin, Lorain; Steve Spisak, Elyria, both of Ohio

[73] Assignee: TRW Inc., Cleveland, Ohio

[21] Appl. No.: 791,863

[22] Filed: Apr. 28, 1977

[51] Int. Cl.² ............................................. B23K 9/20
[52] U.S. Cl. .................................................. 219/98
[58] Field of Search .................... 219/98, 99; 91/303, 91/466; 200/34

[56] References Cited

U.S. PATENT DOCUMENTS

| | | | |
|---|---|---|---|
| 2,424,901 | 7/1947 | Richolt | 91/466 |
| 2,794,868 | 6/1957 | McMorran | 200/34 |
| 3,242,307 | 3/1966 | Mowry et al. | 219/98 |
| 3,313,910 | 4/1967 | Sciaky | 219/89 |
| 3,723,698 | 3/1973 | Logan | 219/98 |
| 4,019,001 | 4/1977 | Krueger | 200/34 |

*Primary Examiner*—J. V. Truhe
*Assistant Examiner*—Clifford C. Shaw
*Attorney, Agent, or Firm*—Allen D. Gutchess, Jr.

[57] ABSTRACT

Apparatus for welding studs to workpieces by a drawn-arc welding technique is provided. The apparatus includes a stud welding tool having a plunge dampener mounted on the rear end thereof for dampening the plunge stroke of the stud during the welding cycle. The plunge dampener includes a rolling diaphragm which reduces friction. The plunge dampener also incorporates both vacuum and pressure for dampening the plunge stroke of the stud.

17 Claims, 5 Drawing Figures

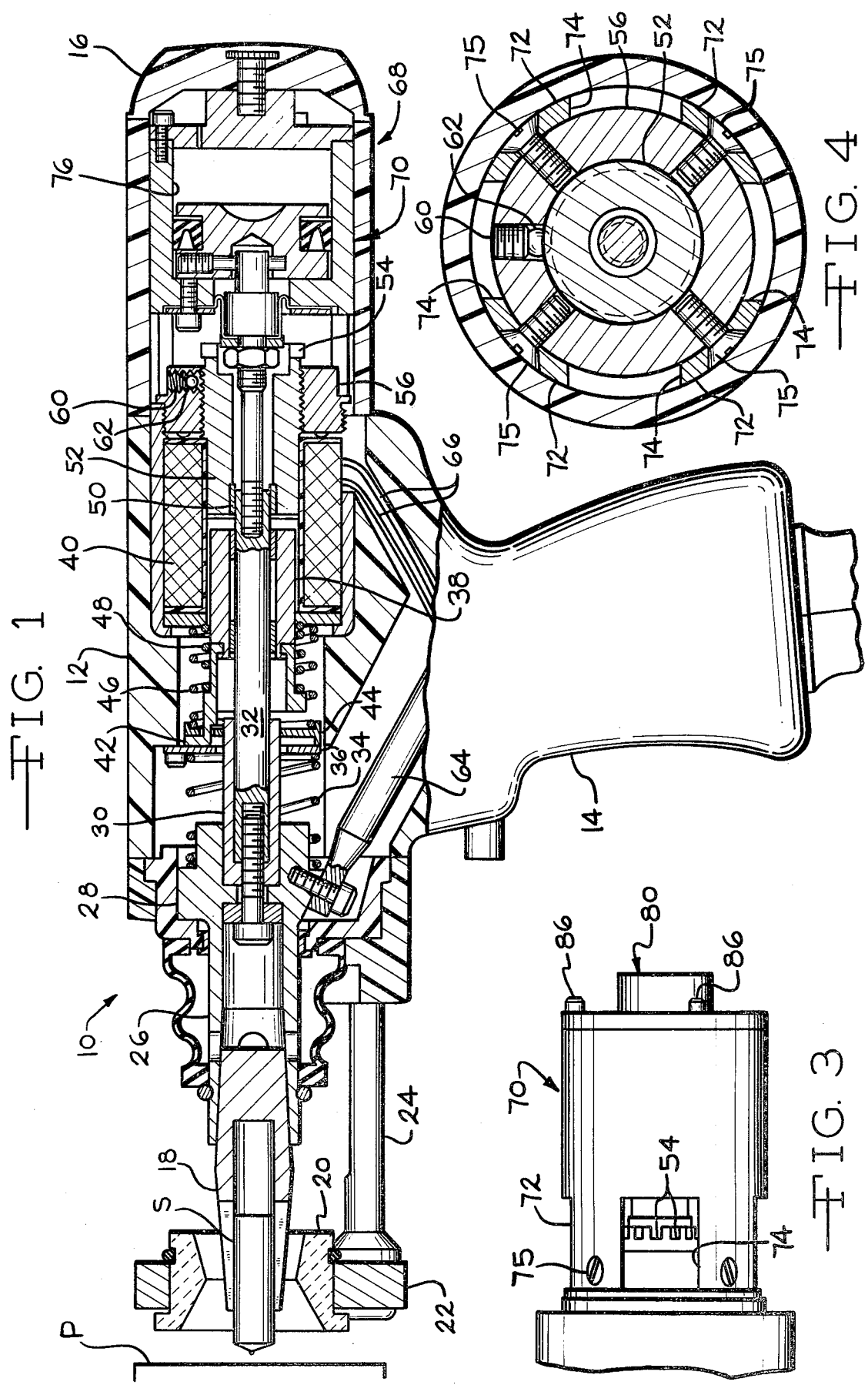

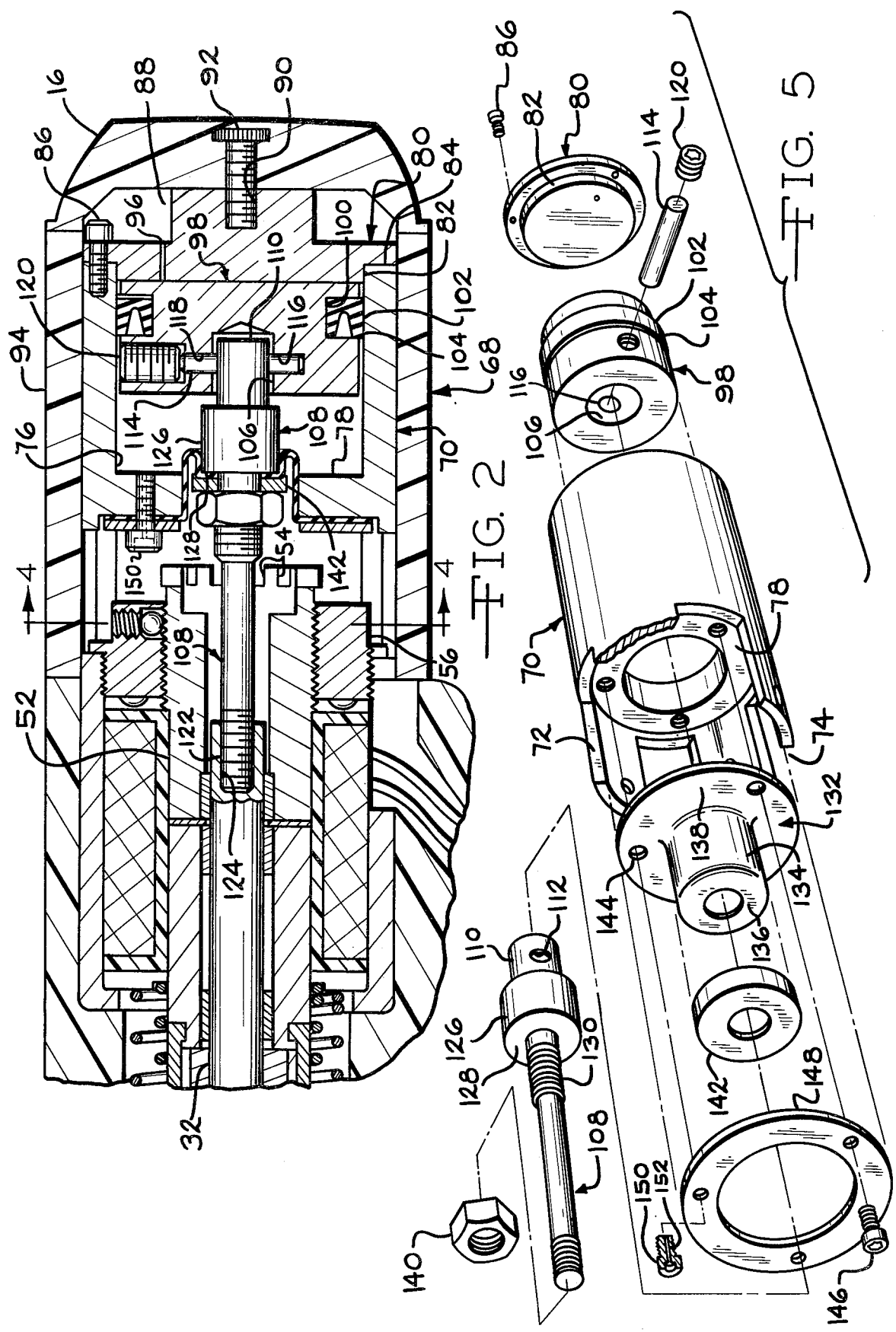

PLUNGE DAMPENER

This invention relates to stud welding apparatus and more particularly to a plunge dampener for dampening the plunge stroke of a stud during a stud welding cycle.

In welding studs to workpieces by a drawn-arc welding technique, the stud is withdrawn from the workpiece and a pilot arc is struck therebetween. Subsequently, a heavier, main welding arc is imposed on the first arc and the stud is plunged back against the workpiece, at which time molten pools of metal on the stud and on the workpiece solidify to complete the weld. One difficulty, particularly with larger studs, is that splattering or splashing of the molten metal may result when the stud is plunged against the surface of the workpiece after the main welding arc is imposed therebetween. The stud is moved into contact with the surface under relatively high force and high velocity with the result that some of the molten metal is squeezed from between the stud and the surface and may be thrown some distance in all directions. The molten metal has a tendency to be hazardous as well as to be disconcerting to the operator. Further, the molten metal tends to mar the surface of the workpiece, the stud shank, and surrounding objects, if solidified beads of the metal adhere thereto. In particular, the splattering metal makes it difficult to accurately and uniformly control the fillet of the weld metal formed between the stud and the workpiece surface. The fillet is important to both the strength and the appearance of the weld.

The present invention provides a plunge dampener for moving the stud at a much slower rate toward the workpiece particularly near the end of the plunge stroke when the stud is about to contact the workpiece. The splatter of molten metal is substantially reduced by this type of plunge stroke, resulting in better fillet control, safer and less annoying operating conditions, and less marring of the work surface, the stud, and other objects.

The improved plunge dampener according to the invention has several unique features. It is mounted on the rear end of the stud welding tool rather than on the front, behind the chuck, as heretofore. This provides a better balance for the welding tool; it also enables closer control over the positioning and manipulation of the stud by the operator because the tool handle is closer to the stud and chuck than if the plunge dampener were positioned therebetween. The new plunge dampener also incorporates both positive pressure and vacuum to control and slow down the plunge stroke of the stud, the plunge dampener having orifices both in front of and behind the piston thereof. In addition, the plunge dampener incorporates a rolling diaphragm which assures good sealing around a pivoted piston rod of the piston and also substantially eliminates any drag on the piston rod which ordinarily results with conventional seals.

It is, therefore, a principal object of the invention to provide an improved plunge dampener for apparatus for welding studs to workpieces by a drawn-arc, stud welding technique.

Another object of the invention is to provide a stud welding tool with a plunge dampener which is mounted on the rear end thereof.

A further object of the invention is to provide a plunge dampener for stud welding, which dampener employs both positive pressure and vacuum to control the plunge stroke of the stud.

Yet another object of the invention is to provide an improved plunge dampener having a pivoted piston rod and a rolling diaphragm to seal same.

Many other objects and advantages of the invention will be apparent from the following detailed description of a preferred embodiment thereof, reference being made to the accompanying drawings, in which:

FIG. 1 is a side view in elevation, with parts broken away and with parts in cross section, of a welding tool embodying the invention;

FIG. 2 is an enlarged, fragmentary view in vertical cross section taken through a rear portion of the stud welding tool of FIG. 1;

FIG. 3 is a side view in elevation of the plunge dampener shown in FIGS. 1 and 2;

FIG. 4 is a view in transverse cross section taken along the line 4—4 of FIG. 2; and FIG. 5 is an exploded view in perspective of the plunge dampener, with certain parts broken away.

Referring to the drawings, a stud welding tool 10 according to the invention is used to weld a stud designated S to a workpiece P by means of a drawn-arc welding technique. The tool includes means for retracting the stud from the workpiece, means for holding the stud in a retracted position for a predetermined period, and means for moving or plunging the stud toward and against the workpiece at the end of the predetermined period. As the stud is retracted from the workpiece, a pilot arc is drawn therebetween and a main welding arc is subsequently imposed on the pilot arc with the main arc being maintained until the stud is plunged back against the workpiece.

The tool 10 includes a main body or housing 12 of suitable dielectric material, the body having an integral piston grip 14 and a separate rear end cap 16. A chuck 18 is located at the front end of the tool for holding the stud S during the welding operation. In this instance, the stud is surrounded by a permanent spark shield 20 attached to a welding foot 22 which, in turn, is adjustably supported by two legs 24, as is known in the art. However, a ceramic ferrule can be used in place of the permanent spark shield 20, particularly when larger studs are employed.

The chuck 18, in this instance, is held in a chuck leg 26 which extends forwardly of a cable clamp 28. A lifting rod sleeve 30 and a lifting rod 32 are affixed to and extend rearwardly from the cable clamp 28, the rod extending beyond the sleeve 30. A main plunge spring 34 is located between the cable clamp 28 and a stop plate 36 and urges the stud S forwardly.

The lifting rod 32 projects through a movable core 38 which is located in an electrical coil 40, the core 38 having a forward end connected by a lifting hook 42 to a lifting ring 44. The lifting ring 44 is ordinarily maintained perpendicular to the sleeve 30 and the rod 32 by a rear outer spring 46. A rear inner spring 48 also helps maintain the hook 42 in that position regardless of the position in which the welding tool is used.

To the rear of the movable core 38, the lifting rod 32 is slidably received in a bearing 50 of an adjustable core stop 52. The core stop 52 has a plurality of rear notches 54 which can be engaged by a screwdriver or other suitable tool for turning the core stop 52 in and out relative to a threaded rear block 56. When the core stop 52 is in the desired position, a setscrew 60 (FIGS. 1 and 4) is turned down against a plastic ball 62 to prevent accidental turning and adjustment of the core stop 52.

The welding tool 10 described to this point is substantially of a known design. In the operation of the tool, with the stud S in the chuck 18, the tool is pressed against the workpiece until the end of the stud S becomes flush with the forward end of the spark shield 20. During this movement, the chuck leg 26, the cable clamp 28, the sleeve 30, and the lifting rod 32 move rearwardly against the force of the plunge spring 34. Because the lifting ring 44 is perpendicular to the sleeve and the rod, the lifting ring has no effect on this initial movement of the chuck assembly and specifically the sleeve 30.

When the trigger is pulled, a voltage potential is established through a welding cable 64 between the stud and the workpiece. Substantially at this time, power is supplied to the coil 40 through rear conductors 66 to cause the movable core 38 to retract. As the core begins to retract, it moves the lifting ring hook 42 rearwardly, causing the lifting ring 44 to move to a canted position. At this time, the edges of the central opening of the lifting ring hook bite into the sleeve 30 and cause it and the rest of the chuck assembly to move rearwardly, retracting the stud from the workpiece and establishing a pilot arc. This movement continues until the rear end of the movable core 38 engages the front annular surface of the adjustable core stop 52. When the power to the coil 82 is shut off, the main plunge spring 34 moves the stud S toward the workpiece. A main welding arc is also established between the stud and the workpiece with this arc being maintained until the stud substantially contacts the workpiece. This assures that the pools of molten metal formed by the main welding arc remain molten until the stud and workpiece come together.

Heretofore, undesirable splattering or splashing of the molten metal has occurred, with this metal being thrown out through vents in the spark shield or the ceramic ferrule, such vents being necessary to dissipate welding gases. The splattering is both disconcerting and dangerous to the operator and constitutes a possible fire hazard. The molten metal beads or berries sometimes mar the surface of the workpiece or the stud, especially if they adhere thereto. Of particular importance is the fact that splattering of the molten metal reduces control over the density and configuration of the fillet of weld material formed between the end of the stud and the workpiece, the fillet affecting both the strength and the appearance of the weld.

The present invention provides an improved plunge dampener 68 mounted on the rear of the stud welding tool between the body 12 and the cap 16. The plunge dampener substantially slows the plunge stroke of the stud, especially as the stud is about to contact the workpiece. The slower movement of the stud greatly reduces the uncontrolled loss of molten metal by splatter and results in improved fillet control, safer and less annoying operation, and less marring of the stud, workpiece, and other surfaces.

The plunge dampener 68 includes a main body 70 having four peripherally-spaced, arcuate legs 72 extending forwardly with openings 74 being located therebetween. The legs 72 fit closely around a rear portion of the block 56 and are affixed thereto by screws 75 (FIGS. 3 and 4). The openings 74 provide access to the notches 54 of the adjustable core stop 52 as well as access to the setscrew 60. The rear portion of the main body 70 forms a cylinder 76, the cylinder also being defined by an inwardly-extending, annular flange 78 (FIGS. 2 and 5) of the body 70 and a rear, end cap 80. The end cap 80 has an annular shoulder 82 fitting with an annular end 84 of the body 70 and is affixed thereto by three machine screws 86. A rear central projection 88 of the end cap 80 has a threaded recess 90 therein to receive a threaded stud 92 which is molded into the end cap 16 and affixes the end cap to the tool, clamping a dielectric sleeve 94 between the cap 16 and the rear end of the body 12 to serve as a rear extension of the body. The end cap 80 also has an orifice or passage 96 extending therethrough and communicating with the rear or blind end of the cylinder 76. If desired, the orifice can be formed in a replaceable screw threaded into the cap 80.

A piston 98 is located in the cylinder 76 and has an annular groove 100 therein which receives a piston ring 102 having an outer, forwardly-extending lip 104. The piston 98 also has a forwardly-facing, central recess 106 therein which receives a piston rod 108 and specifically a rear, cylindrical connecting portion 110 thereof. The portion 110 has a relatively large transverse bore 112 therein through which a connecting pin 114 extends, the pin being held in a recess 116 and a passage 118 by a setscrew 120. The passage 112 has a diameter larger than that of the pin 114 and the recess 106 has a diameter exceeding that of the connecting portion 110 to enable the piston rod 108 to pivotally move with respect to the piston 98. This prevents any possibility of the piston rod being misaligned with the lifting rod 32 and causing possible binding or drag. The piston rod 108 is connected to the lifting rod 32 by a forward threaded end 122 threaded into a tapped recess 124 in the rear end of the lifting rod 32.

Between the threaded end 122 and the rear portion 110, the piston rod 108 has a cylindrical enlargement 126 forming a forward shoulder or annular surface 128 adjacent an intermediate threaded portion 130. This configuration enables the intermediate portion 126 of the piston rod 108 to receive a rolling, sealing diaphragm 132 having a cylindrical hub portion 134 with an inwardly-extending flange 136 and an outwardly-extending flange 138. The hub portion 134 has a diameter similar to that of the enlargement 126 to enable the diaphragm 132 to roll smoothly as the piston and piston rod move back and forth. The inner flange 136 is held on the piston rod 108 and specifically is affixed between the annular surface 128 and a nut 140 which is threaded on the intermediate threaded portion 130 of the piston rod. A sealing washer 142 is located between the flange 136 and the nut 140.

The outer flange 138 of the diaphragm 132 has openings 144 therein by means of which the diaphragm is affixed to the front annular surface of the intermediate flange 78 of the body 70. Machine screws 146 affix the flange 138 to the intermediate flange 78 through a retaining washer or ring 148. There are two of the screws 146 while an additional orifice screw 150 is employed in one position with an orifice or passage 152 of controlled diameter extending axially therethrough. The rear orifice or passage 96 in the cap 80 and the forward orifice or passage 152 in the screw 150 provide controlled flow of compressible fluid to and from the cylinder 76 behind and in front of the piston 98.

In operation, when the electrical coil 40 is energized and the movable core 38 moves rearwardly, the piston 98, through the piston rod 108, similarly moves rearwardly from a position forwardly in the cylinder 76, as shown in FIG. 1, for example, to a rearward position in the cylinder 76, as shown in FIG. 2, for example. During this movement, air or other compressible fluid in the rear of the cylinder 76 is expelled through the orifice 96 with this air being under positive pressure as the piston 98 retracts. In the forward portion of the cylinder 76, air or other compressible fluid is being drawn through the orifice 152 in the screw 150 as the piston retracts, causing air or other compressible fluid in the forward portion of the cylinder 76 to be under a negative or subatmospheric pressure. The retraction of the piston 98 in the cylinder 76, however, is not slowed down to the point of being detrimental to the welding cycle.

When the power to the coil 40 is shut off, the main plunge spring 34 immediately takes over and forces the chuck assembly rapidly toward the workpiece P through the force on the cable clamp 28. This sudden movement moves the piston 98 forwardly in the cylinder 76 and causes the air forwardly thereof to be compressed as it is pushed out the orifice 152 in the screw 150. Similarly, the air in the rear portion of the cylinder 76, behind the piston 98, is under negative pressure as air is pulled into the cylinder through the orifice 96. Hence, both a negative and positive pressure are employed with the plunge dampener 68 to cause the stud S to slow down significantly during the plunge stroke, especially as the stud approaches the workpiece.

The rolling diaphragm 132 provides an effective seal at the forward end of the cylinder 76 without causing any undue drag or friction on the operation of the plunge dampener. Further, the rolling diaphragm enables the piston rod 108 to be pivoted in all directions relative to the piston 98 and still enables an effective seal to be obtained.

Various modifications of the above-described embodiment of the invention will be apparent to those skilled in the art, and it is to be understood that such modifications can be made without departing from the scope of the invention, if they are within the spirit and the tenor of the accompanying claims.

We claim:

1. Apparatus for welding a stud to a surface of a workpiece by a drawn-arc, stud welding technique, said apparatus comprising a welding tool body, means carried by said body for holding the stud with an end toward the workpiece, means for establishing a welding arc between the stud and the workpiece when the stud is spaced from the workpiece, means for moving the holding means and the stud toward and away from the workpiece, and means for slowing the movement of the stud toward the workpiece by said moving means, and including means forming a cylinder affixed to a rear portion of said welding tool body, a piston in said cylinder, a piston rod connected to said stud moving means, and means connecting said piston to said piston rod to enable pivotal movement of said piston rod relative to said piston in all directions.

2. Apparatus according to claim 1 characterized by orifice means in the blind end of said cylinder communicating with the atmosphere, and second orifice means in the rod end of said cylinder communicating with the atmosphere.

3. Apparatus according to claim 2 characterized by said second orifice means being formed in a replaceable screw extending through said cylinder-forming means.

4. Apparatus according to claim 1 characterized by a diaphragm affixed to the forward end of said cylinder-forming means and to an intermediate portion of said piston rod.

5. Apparatus according to claim 4 characterized by said diaphragm having a hub portion, an outwardly-extending flange at one end thereof and an inwardly-extending flange at the other end thereof, said outwardly-extending flange being affixed to the forward end of said cylinder-forming means and said inwardly-extending flange being affixed to the intermediate portion of said piston rod.

6. Apparatus according to claim 5 characterized by said hub portion of said diaphragm being cylindrical, and the intermediate portion of said piston rod being cylindrical and of a diameter similar to the diameter of the hub portion.

7. Apparatus according to claim 6 characterized by said piston rod having a threaded portion adjacent said intermediate portion, and a nut on said threaded portion holding said inwardly-extending flange against said intermediate portion.

8. Apparatus according to claim 7 characterized by said second orifice means being in a screw extending through said cylinder-forming means.

9. Apparatus for welding a stud to a surface of a workpiece, said apparatus comprising means for holding the stud, means for establishing a welding arc between the stud and the workpiece, means for moving the stud toward and away from the workpiece, and dampening means for slowing the movement of the stud as it approaches the workpiece, said dampening means comprising means forming a cylinder, a piston in said cylinder, means connecting said piston and said stud moving means, said connecting means comprising a piston rod connected to said piston and to said stud-moving means, and means connecting said piston rod to said piston in a manner to enable said piston rod to pivot relative to said piston in all directions, orifice means in said cylinder on one side of said piston communicating with the atmosphere, and second orifice means in said cylinder on the opposite side of said piston communicating with the atmosphere.

10. Apparatus for welding a stud to a surface of a workpiece, said apparatus comprising means for holding the stud, means for establishing a welding arc between the stud and the workpiece, means for moving the stud toward and away from the workpiece, and dampening means for slowing the rate at which the stud is moved toward the workpiece by said moving means as the stud approaches the workpiece, said dampening means comprising means forming a cylinder including an annular flange, a piston in said cylinder, a piston rod connected to said piston and to said stud-moving means, said piston rod being connected to said piston by means which enables said piston rod to move in all directions about a pivot point relative to said piston, and a rolling diaphragm affixed to said flange of said cylinder-forming means and to an intermediate portion of said piston rod.

11. Apparatus according to claim 10 characterized by said piston having a central recess therein, said piston rod having a transverse bore, and a pin extending across said recess and held by said piston and extending through said transverse bore, said pin having a diameter smaller than that of said bore and said central recess having a diameter larger than the connected end of said piston rod.

12. Apparatus for welding a stud to a surface of a workpiece, said apparatus comprising means for holding the stud, means for establishing a welding arc between the stud and the workpiece, means for moving the stud toward and away from the workpiece, and dampening means for slowing the rate at which the stud is moved toward the workpiece by said moving means as the stud approaches the workpiece, said dampening means comprising means forming a cylinder including an annular flange, a piston in said cylinder, a piston rod connected to said piston and to said stud-moving means, a rolling diaphragm affixed to said flange of said cylinder-forming means and to an intermediate portion of said piston rod, said rolling diaphragm including a hub portion, an inwardly-extending flange at one end of said hub portion, and an outwardly-extending flange at the other end of said hub portion, said outwardly-extending flange being affixed to said flange of said cylinder-forming means, and said inwardly-extending flange being affixed to the intermediate portion of said piston rod, and screw means affixing said outwardly-extending flange of said diaphragm to said cylinder-forming means flange, and an orifice extending through said screw means.

13. Apparatus according to claim 12 characterized by the intermediate portion of said piston rod having an enlarged portion, and said inwardly-extending flange of said diaphragm being affixed to said enlarged portion.

14. Apparatus according to claim 13 characterized by said hub portion of said diaphragm being cylindrical, and said intermediate portion of said piston rod being cylindrical and having a diameter similar to that of said hub portion of said diaphragm.

15. Apparatus according to claim 13 characterized by said piston rod having a threaded portion adjacent said enlarged portion, and a nut on said threaded portion holding said inwardly-extending flange of said diaphragm against said enlarged portion.

16. Apparatus for welding a stud to a surface of a workpiece, said apparatus comprising means for holding the stud, means for establishing a welding arc between the stud and the workpiece, means for moving the stud toward and away from the workpiece, and dampening means for slowing the movement of the stud as it approaches the workpiece, said dampening means comprising means forming a cylinder, a piston in said cylinder, a piston rod connecting said piston and said stud-moving means, a diaphragm affixed to an end of said cylinder-forming means and affixed to an intermediate portion of said piston rod, first orifice means in said cylinder on one side of said piston communicating with the atmosphere, said first orifice means being of a sufficiently small size as to inhibit flow of air into said cylinder as the stud is moved toward the workpiece, and second orifice means in said cylinder on the opposite side of said piston communicating with the atmosphere, said second orifice means being of a sufficiently small size as to inhibit flow of air out of the cylinder as the stud is moved toward the workpiece.

17. Apparatus according to claim 16 characterized by said stud moving means comprising a lifting rod, and said piston rod being connected to the rear end of said lifting rod of said moving means.

* * * * *